No. 121,040. Patented Nov. 21, 1871.

JOHN D. BEERS.
WHEEL JOURNAL BOX.

WITNESSES.
Thomas J. Bewley
Stephen Ustick

INVENTOR.
John D. Beers 121,040

UNITED STATES PATENT OFFICE.

JOHN D. BEERS, OF PHILADELPHIA, PENNSYLVANIA.

IMPROVEMENT IN JOURNAL-BOXES.

Specification forming part of Letters Patent No. 121,040, dated November 21, 1871; antedated November 2, 1871.

*To all whom it may concern:*

Be it known that I, JOHN D. BEERS, of the city of Philadelphia, county of Philadelphia and State of Pennsylvania, have invented certain Improvements in Journal-Boxes, of which the following is a specification:

This invention relates to that class of journal-boxes which has two wheels, on which a journal of the axle rotates.

Ordinarily it is necessary to use a lubricant to decrease the friction of the journals of the wheel. This I dispense with by constructing each wheel with a central bore, large enough to inclose a series of geared rollers, whose peripheries turn or roll on a central axle permanently attached at each end to a stationary frame. The wheels and the rollers are geared together, as hereinafter described, whereby a regular motion of the latter is effected. To prevent lateral motion of the wheels, their corners are curved and fit corresponding curves of the shoulders of the journals of the axle; and the shoulders of the journals of the rollers are also curved and fit curves in the corners of cogged rings in which the journals turn.

In the accompanying drawing, which makes a part of this specification—

Figure 1:
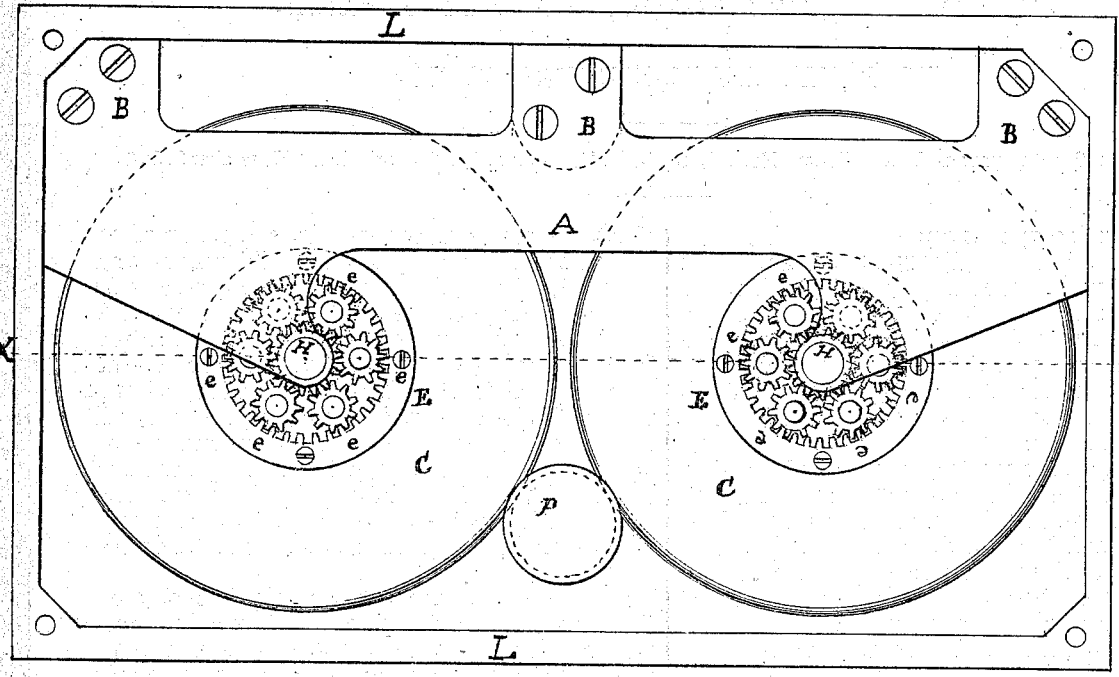
Figure 2:
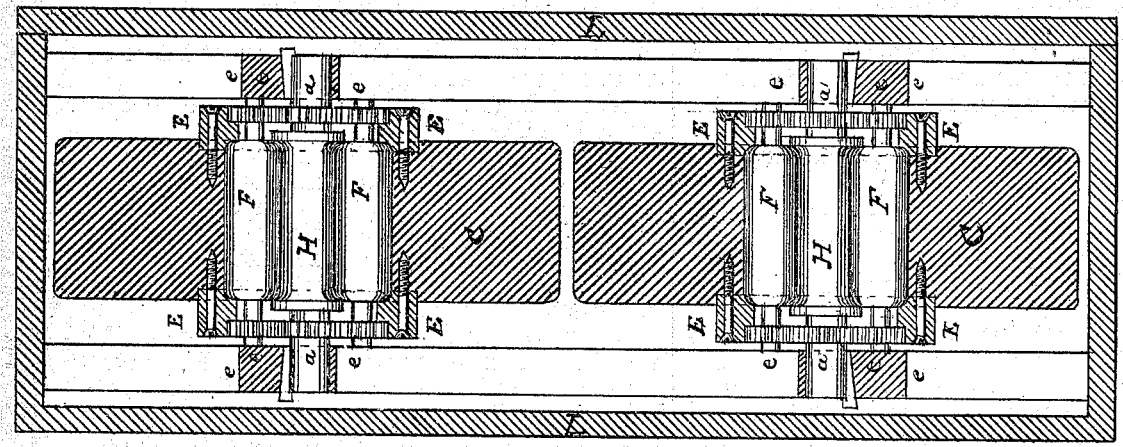
Figure 3:
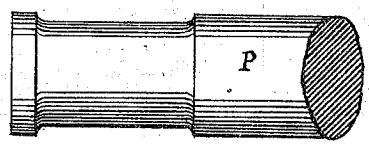

Figure 1 is a side elevation of the improved journal-box. Fig. 2 is a horizontal section at the line $x\ x$ of Fig. 1.

Like letters in both figures indicate the same parts.

A is a frame, to which the ends of the stationary shafts H H are permanently attached. The frame is bolted at B B B to lugs of the case L, which are represented by dotted lines, in the upper corners and central fastening. C C are two wheels, whose central portions are bored out of uniform diameter. Into the bore of each wheel is placed a series of rollers, F, which surrounds the stationary shaft H, the wheels revolving freely on the rollers and the latter on the said shaft. A series of cog-wheels, $e$, is fastened on the outer ends of the journals of the rollers, and gears into the teeth of the rings E E and wheels $a\ a$ on the ends of the shaft H. The rings E E fit in recesses of the wheel C, and are secured by means of bolts or screws, as shown in the drawing. The rollers F are rounded at the shoulders of the journals and fit curves in the rings E E; and a like form is given to the corners of the wheels C C and the shoulders of the journals of the axle P, as shown in Fig. 2, whereby lateral motion of the wheels C is prevented. The cog-wheels $a\ a$ do not revolve, being fastened on the shaft H.

The journals of the shaft or axle P revolve on the peripheries of the wheels C C, whereby motion is given to the latter and communicated to the rollers F, which revolve upon the periphery of the shafts H, the gearing of the rollers giving a positive and uniform motion to the rollers.

I disclaim the invention, separately, of anti-friction wheels or their cog gearing, or the separate use of anti-friction rollers; but What I do claim as new, and desire to secure by Letters Patent, is—

1. The combination of the journals of the axle P with the wheels C C, and the combination of said wheels with the rollers F and stationary axles H H, when the said parts are constructed and arranged in relation to each other and geared together, substantially in the manner and for the purpose above set forth.

2. The curving of the shoulders of the shaft P and the corners of the wheels C C in relation to each other, and also the shoulders of the journals of the rollers F and the corners of the rings E in like manner, substantially as and for the purpose specified.

JOHN D. BEERS.

Witnesses:
 THOMAS J. BEWLEY,
 STEPHEN USTICK.

(87)